(12) United States Patent
Park et al.

(10) Patent No.: US 11,999,338 B2
(45) Date of Patent: Jun. 4, 2024

(54) INTEGRATED ELECTRONIC BRAKE APPARATUS AND CONTROL METHOD THEREOF

(71) Applicant: HYUNDAI MOBIS CO., LTD., Seoul (KR)

(72) Inventors: Jae Hyun Park, Yongin-si (KR); Ju Ho Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 248 days.

(21) Appl. No.: 17/677,274

(22) Filed: Feb. 22, 2022

(65) Prior Publication Data
US 2022/0266805 A1     Aug. 25, 2022

(30) Foreign Application Priority Data
Feb. 23, 2021 (KR) .......... 10-2021-0024059

(51) Int. Cl.
*B60T 8/88* (2006.01)
*B60T 8/92* (2006.01)
*B60T 17/22* (2006.01)

(52) U.S. Cl.
CPC .......... *B60T 8/885* (2013.01); *B60T 8/92* (2013.01); *B60T 17/221* (2013.01); *B60T 2220/04* (2013.01); *B60T 2240/00* (2013.01); *B60T 2270/10* (2013.01); *B60T 2270/30* (2013.01); *B60T 2270/402* (2013.01);
(Continued)

(58) Field of Classification Search
CPC .......... B60T 8/885; B60T 8/92; B60T 17/221; B60T 2220/04; B60T 2240/00; B60T 2270/10; B60T 2270/30; B60T 2270/402; B60T 2270/404; B60T 2270/406; B60T 2270/82; B60T 2270/88; B60T 7/042; B60T 13/741; B60T 8/17; B60T 8/329; B60T 13/683; B60T 13/74; B60T 2270/40; B60Q 1/441; B60R 16/023; B60Y 2400/81
See application file for complete search history.

(56) References Cited

U.S. PATENT DOCUMENTS

2013/0314222 A1* 11/2013 Park ................ B60T 13/741
                                                   340/453
2022/0073038 A1*  3/2022 Suzuki ............... F16D 65/18

FOREIGN PATENT DOCUMENTS

KR         10-1417863 B1    7/2014

* cited by examiner

*Primary Examiner* — Grant Moubry
*Assistant Examiner* — Ruben Picon-Feliciano
(74) *Attorney, Agent, or Firm* — NovoTechIP International PLLC

(57) ABSTRACT

Disclosed are an integrated electronic brake apparatus and a control method thereof. The integrated electronic brake apparatus includes a main controller provided in a first area and configured to: drive a braking motor according to an operation of a pedal, drive an additional braking valve for additional braking, and generate a main control monitoring signal; the sub-controller provided in a second area and configured to: drive a main braking valve for braking of a vehicle and the braking motor according to the operation of the pedal, control a power of the additional braking valve, and generate a sub-control monitoring signal; and a connection bus configured to transfer a transmission/reception signal between the main controller and the sub-controller by connecting the first area and the second area within an enclosure with each other.

18 Claims, 3 Drawing Sheets

(52) U.S. Cl.
CPC ... *B60T 2270/404* (2013.01); *B60T 2270/406* (2013.01); *B60T 2270/82* (2013.01); *B60T 2270/88* (2013.01)

INTEGRATED ELECTRONIC BRAKE APPARATUS AND CONTROL METHOD THEREOF

CROSS-REFERENCE TO RELATED APPLICATION

This application claims priority from and the benefit of Korean Patent Application No. 10-2021-0024059, filed on Feb. 23, 2021, which is hereby incorporated by reference for all purposes as if set forth herein.

BACKGROUND

Field

Exemplary embodiments of the disclosure relate to an integrated electronic brake apparatus and a control method thereof, and more particularly, to an integrated electronic brake apparatus and a control method thereof, in which a control module of the integrated electronic brake apparatus is configured as a main controller and a sub-controller positioned at two different areas within an enclosure using an internal connection bus, and the main controller and the sub-controller hand over a control right for implementing main braking to each other through mutual cooperation with real-time information exchange in a manner that in case of a main controller failure, the sub-controller not only cuts off a power of an additional braking valve for additional braking to prevent malfunction but also controls a main braking valve and a braking motor to implement main braking, and in case of a sub-controller failure, the main controller controls the braking motor and an EPB to implement the main braking.

Discussion of the Background

In a vehicle, a brake system is absolutely necessary. This is because a vehicle being unable to stop is unable to run. Accordingly, stability of a brake system cannot be overemphasized for passenger's safety.

Accordingly, the brake system boosts and provides a braking hydraulic pressure using an electronic master booster instead of a conventional hydraulic system, and an anti-lock brake system (ABS) for shortening the braking distance by preventing a tire lock and avoiding an abrupt operation of a steering wheel for risk avoidance during sudden braking, an electronic stability control (ESC) for stably maintaining the attitude of a vehicle by adjusting the vehicle braking force and an engine output in a dangerous situation in which the vehicle slides, and an electronic parking brake (EPB) for automatically locking or unlocking the brake when the vehicle stops or starts so that the vehicle is prevented from being pushed back when the vehicle stops or starts on the hill have been adopted.

Recently, as interest in an autonomous vehicle or an electric vehicle is increasing, the brake system also requires stronger braking force and stability, and the electronic control brake apparatuses described above have been combined and applied.

The background technology of the disclosure is disclosed in Korean Patent No. 10-1417863 (published on Jul. 9, 2014 and entitled "Electric Control Brake System".

SUMMARY

In order to implement braking through combination of electronic control brake apparatuses, a great number of wirings for operating the respective apparatuses are necessary.

Further, in order to mount the respective electronic control brake apparatuses, mounting positions for mounting the respective apparatuses are necessary, which causes a problem in that a mounting space needs to be secured in a vehicle.

Meanwhile, if the electronic control brake apparatuses are unable to operate due to a failure which occurs during driving of the vehicle, a major accident may be followed, and there is a need to prepare for the inoperable state of the electronic control brake apparatuses.

In order to solve the above problems, an aspect of the disclosure is directed to an integrated electronic brake apparatus and a control method thereof, in which a control module of the integrated electronic brake apparatus is configured as a main controller and a sub-controller positioned at two different areas within an enclosure using an internal connection bus, and the main controller and the sub-controller hand over a control right for implementing main braking to each other through mutual cooperation with real-time information exchange in a manner that in case of a main controller failure, the sub-controller not only cuts off a power of an additional braking valve for additional braking to prevent malfunction but also controls a main braking valve and a braking motor to implement main braking, and in case of a sub-controller failure, the main controller controls the braking motor and an EPB to implement the main braking.

In one aspect of the disclosure, an integrated electronic brake apparatus may include: a main controller provided in a first area and configured to: receive one or more of values of a pedal sensor, a cylinder pressure sensor, and a wheel speed sensor and an EPB signal in accordance with a sub-control monitoring signal generated by a sub-controller, drive a braking motor in accordance with an operation of a pedal, drive an additional braking valve for additional braking, and generate a main control monitoring signal; the sub-controller provided in a second area and configured to: receive one or more of the values of the pedal sensor and the wheel speed sensor in accordance with the main control monitoring signal generated by the main controller, drive a main braking valve for braking of a vehicle and the braking motor in accordance with the operation of the pedal, control a power of the additional braking valve, and generate the sub-control monitoring signal; and a connection bus configured to transfer a transmission/reception signal between the main controller and the sub-controller by connecting the first area and the second area positioned within an enclosure with each other.

In the disclosure, the main control monitoring signal may include one or more of a watchdog signal generated by the main controller and a fail signal.

In the disclosure, the sub-control monitoring signal may include one or more of a watchdog signal generated by the sub-controller and a fail signal.

In the disclosure, the integrated electronic brake apparatus may further include a first connector positioned at the first area and configured to connect the main controller and a peripheral device with each other; and a second connector positioned at the second area and configured to connect the sub-controller and a peripheral device with each other.

In the disclosure, the main controller and the sub-controller may determine effectiveness of a pedal signal input by the main controller and a pedal signal input by the sub-controller.

In the disclosure, the main controller may include: a first pedal signal input unit configured to receive a pedal stroke value from the pedal sensor; a cylinder pressure input unit configured to receive a cylinder pressure value from the cylinder pressure sensor; a first wheel speed input unit configured to receive and decode a wheel speed value from the wheel speed sensor; an EPB signal input unit configured to receive an EPB signal; an EPB driving unit configured to operate a parking brake; an additional braking valve driving unit configured to drive the additional braking valve for the additional braking; a first motor driving unit configured to drive the braking motor; a first watchdog signal generation unit configured to generate a watchdog signal; and a first micro control unit (MCU) configured to control the additional braking valve driving unit, the first motor driving unit, and the EPB driving unit based on a signal input from one or more of the first pedal signal input unit, the cylinder pressure input unit, the first wheel speed input unit, and the EPB signal input unit in accordance with the sub-control monitoring signal.

In the disclosure, the additional braking valve may include an inlet valve and an outlet valve configured to control a hydraulic pressure being supplied to a wheel cylinder for ABS and ESC driving.

In the disclosure, the main controller may further include a first communication unit configured to communicate with a peripheral control device through in-vehicle communication.

In the disclosure, the first pedal signal input unit may receive the pedal stroke value of the pedal sensor by a first channel output.

In the disclosure, the main controller may further include a first brake light switch configured to operate a brake light.

In the disclosure, the sub-controller may include: a second pedal signal input unit configured to receive a pedal stroke value from the pedal sensor; a second wheel speed input unit configured to receive and decode a wheel speed value from the wheel speed sensor; a main braking valve driving unit configured to drive the main braking valve for braking of a vehicle; a second motor driving unit configured to drive the braking motor; an additional braking valve power switch configured to switch a power of the additional braking valve; a second watchdog signal generation unit configured to generate a watchdog signal; and a second MCU configured to control the additional braking valve power switch, the main braking valve driving unit, and the second motor driving unit based on a signal input from one or more of the second pedal signal input unit and the second wheel speed input unit in accordance with the main control monitoring signal.

In the disclosure, the sub-controller may further include a second communication unit configured to communicate with a peripheral control device through in-vehicle communication.

In the disclosure, the second pedal signal input unit may receive the pedal stroke value of the pedal sensor by a second channel output.

In the disclosure, the sub-controller may further include a second brake light switch configured to operate a brake light.

In the disclosure, the second MCU may have a lower performance specification than the first MCU of the main controller.

In one aspect of the disclosure, a method for controlling an integrated electronic brake apparatus may include: controlling, by a first MCU and a second MCU in cooperation with each other, a main braking valve driving unit, a first motor driving unit, a second motor driving unit, an EPB driving unit, and an additional braking valve driving unit; sensing, by the first MCU and the second MCU, a main control monitoring signal generated by a main controller and a sub-control monitoring signal generated by a sub-controller; turning off, by the second MCU, an additional braking valve power switch in case that the second MCU senses the main control monitoring signal; receiving, by the second MCU, a pedal stroke value and a wheel speed value from a second pedal signal input unit and a second wheel speed input unit; controlling, by the second MCU, the main braking valve driving unit and the second motor driving unit in accordance with the pedal stroke value and the wheel speed value; receiving, by the first MCU, a pedal stroke value and a wheel speed value from a first pedal signal input unit and a first wheel speed input unit in case that the first MCU senses the sub-control monitoring signal; and controlling, by the first MCU, the first motor driving unit and the EPB driving unit in accordance with the pedal stroke value and the wheel speed value.

In the disclosure, the main control monitoring signal may include one or more of a watchdog signal and a fail signal generated by the main controller.

In the disclosure, the sub-control monitoring signal may include one or more of a watchdog signal and a fail signal generated by the sub-controller.

In the disclosure, the method may further include determining, by the first MCU and the second MCU, effectiveness of a pedal signal input from the first pedal signal input unit and a pedal signal input from the second pedal signal input unit.

In the disclosure, the method may further include operating, by the first MCU and the second MCU, a first brake light switch and a second brake light switch, respectively, in case that the pedal stroke value is input.

In the disclosure, the controlling of the main braking valve driving unit and the second motor driving unit may include performing, by the second MCU, braking control by a cooperative control in association with a peripheral control device in a vehicle through a second communication unit.

In the disclosure, the controlling of the first motor driving unit and the EPB driving unit may include performing, by the first MCU, braking control by a cooperative control in association with a peripheral control device in a vehicle through a first communication unit.

According to an integrated electronic brake apparatus and a control method thereof according to aspects of the present disclosure, a control module of the integrated electronic brake apparatus may be configured as a main controller and a sub-controller provided in two independent areas within an enclosure using an internal connection bus, and the main controller and the sub-controller may hand over a control right for implementing main braking to each other through mutual cooperation with real-time information exchange in a manner that in case of a main controller failure, the sub-controller not only cuts off a power of an additional braking valve for additional braking to prevent malfunction but also controls a main braking valve and a braking motor to implement main braking, and in case of a sub-controller failure, the main controller controls the braking motor and an EPB to implement the main braking. Therefore, in implementing a small autonomous vehicle, it is possible to reduce the size and weight of the electronic braking apparatus, and improve stability thereof.

DETAILED DESCRIPTION OF THE ILLUSTRATED EMBODIMENTS

Figure 1:
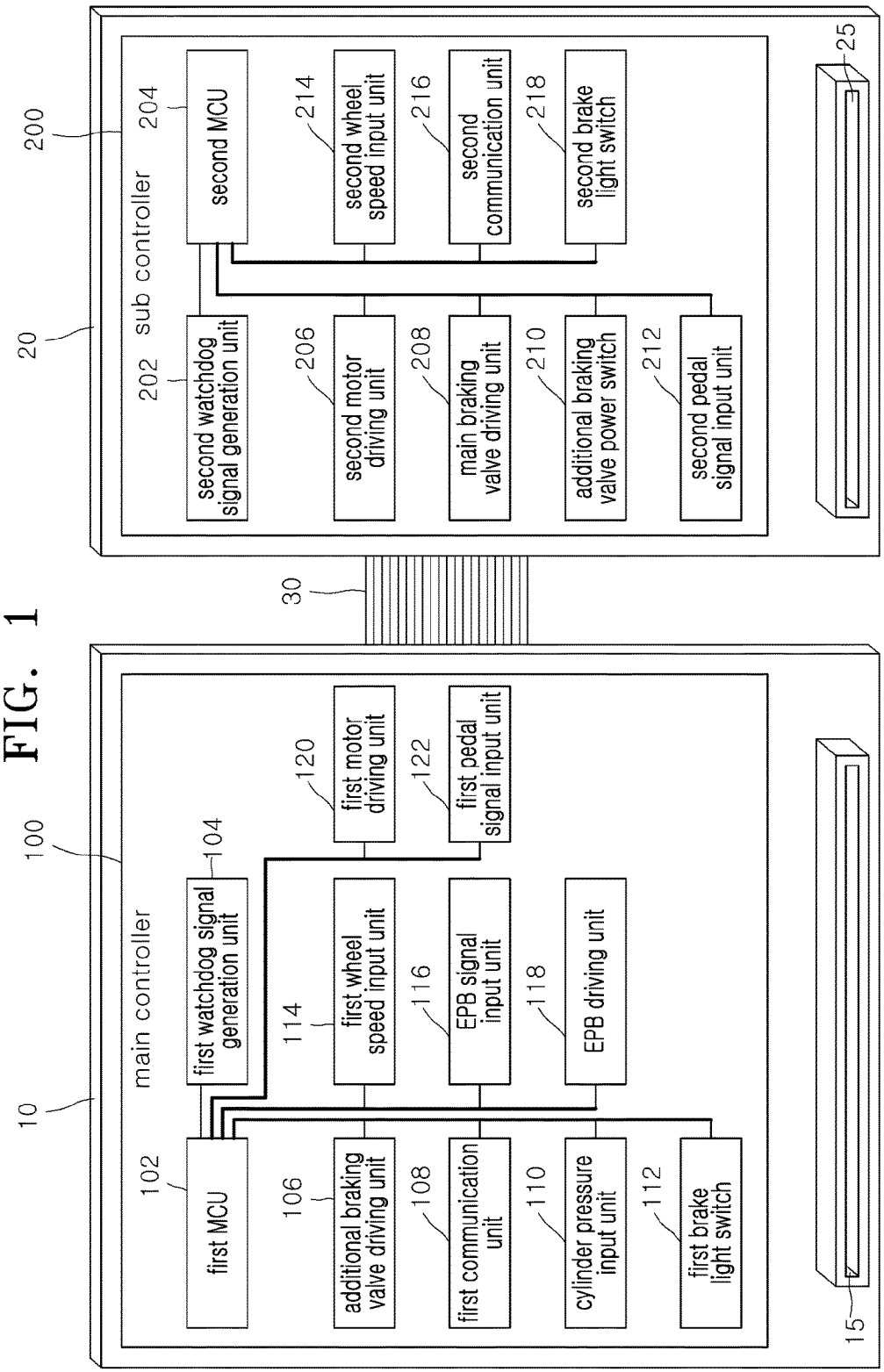
FIG. 1 is a block diagram illustrating the configuration of an integrated electronic brake apparatus according to an embodiment of the disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an integrated electronic brake apparatus and a control method thereof will be described with reference to the accompanying drawings through various exemplary embodiments. In such a process, the thicknesses of lines or the sizes of constituent elements illustrated in the drawings may be exaggerated for clarity and convenience in explanation. Further, terms to be described hereinafter have been defined in consideration of functions in the disclosure, and may differ depending on a user or an operator's intention, or practice. Accordingly, each term should be defined based on the contents over the entire specification.

Figure 2:
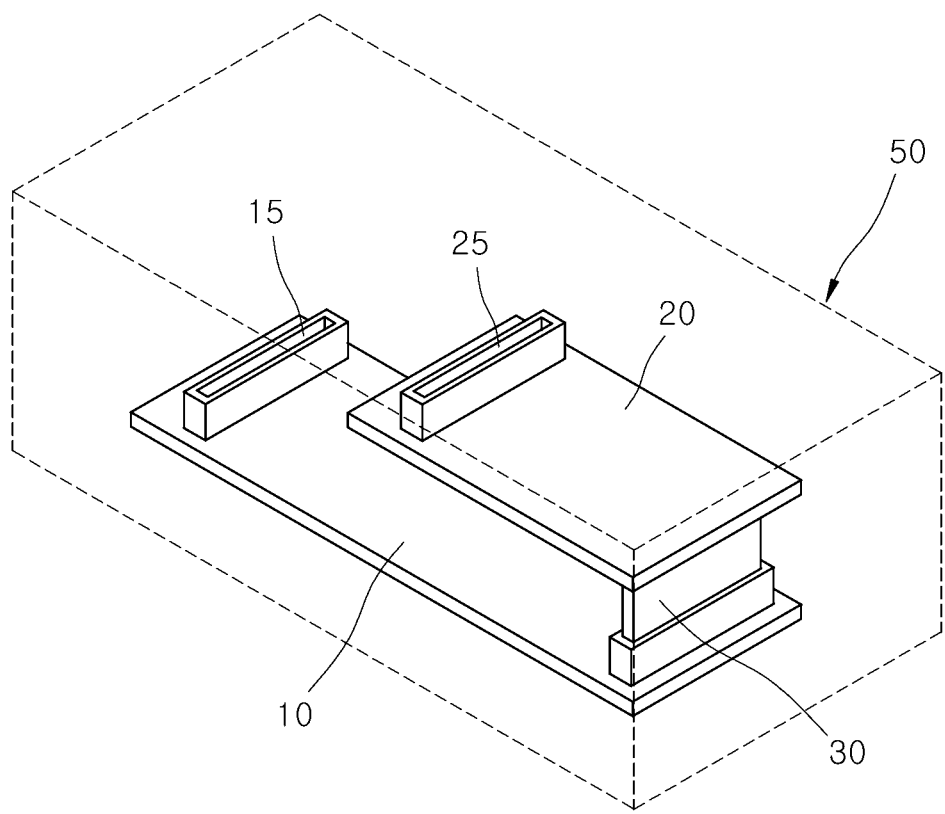
FIG. 2 is an exemplary diagram illustrating the structure of a control module of the integrated electronic brake apparatus according to the embodiment of the disclosure.

FIG. 1 is a block diagram illustrating the configuration of an integrated electronic brake apparatus according to an embodiment of the disclosure, and FIG. 2 is an exemplary diagram illustrating the structure of a control module of the integrated electronic brake apparatus according to the embodiment of the disclosure.

As illustrated in FIGS. 1 and 2, the integrated electronic brake apparatus according to an embodiment of the disclosure may be configured to include a main controller 100, a sub-controller 200, and a connection bus 30.

The main controller 100 may be positioned at a first area 10 within an enclosure or box 50 and configured to: receive one or more of values of a pedal sensor, a cylinder pressure sensor, and a wheel speed sensor and an EPB signal in accordance with a sub-control monitoring signal generated by the sub-controller 200, drive a braking motor in accordance with an operation of a pedal, drive an additional braking valve for additional braking, and generate a main control monitoring signal.

Here, the main control monitoring signal may include one or more of a watchdog signal generated by the main controller and a fail signal of hardware in accordance with the result of diagnosis of the main controller.

The sub-controller 200 may be positioned at a second area 20 within the enclosure 50 and configured to: receive one or more of the values of the pedal sensor and the wheel speed sensor in accordance with the main control monitoring signal generated by the main controller 100, drive a main braking valve for main braking of a vehicle and the braking motor in accordance with the operation of the pedal, control a power of the additional braking valve, and generate a sub-control monitoring signal.

Here, the sub-control monitoring signal may include one or more of a watchdog signal generated by the sub-controller and a fail signal of hardware in accordance with the result of diagnosis of the sub-controller.

The connection bus 30 may transfer a transmission/reception signal between the main controller 100 and the sub-controller 200 through a general purpose input output (GPIO) or a universal asynchronous receiver transmitter (UART) by connecting the first area 10 and the second area 20 positioned within the enclosure 50 with each other.

For example, the connection bus 30 may connect the first area 10 and the second area 20, which are configured on independent PCBs and are disposed as multiple layers in the form of a connector as illustrated in FIG. 2, or may connect the first area 10 and the second area 20, which are dividedly provided on a single-layered PCB, through a pattern.

That is, as illustrated in FIG. 2, a control module of the integrated electronic brake apparatus according to the present embodiment may be configured so that the first area 10, at which the main controller 100 is positioned, and the second area 20, at which the sub-controller 200 is positioned, are formed on independent PCBs and are connected with each other through the connection bus 30 in one enclosure 50, and the first area 10 and the second area 20 are connected to peripheral devices through a wire harness connected to a first connector 15 and a second connector 25.

Further, in case of configuring the main controller 100 and the sub-controller 200 through division of the first area 10 and the second area 20 on the single PCB, the main controller 100 and the sub-controller 200 may be connected to the peripheral devices through at least one of the first connector 15 and the second connector 25, and may be separately provided with data and the power through the connection bus 30.

Here, the main controller 100 and the sub-controller 200 may determine effectiveness of a pedal signal input by the main controller 100 and a pedal signal input by the sub-controller 200.

That is, the main controller 100 and the sub-controller 200 may determine the effectiveness of the pedal signal through reception of a pedal stroke value by a first channel output and a pedal stroke value by a second channel output of the pedal sensor.

More specifically, the main controller 100 may be configured to include a first pedal signal input unit 122, a cylinder pressure input unit 110, a first wheel speed input unit 114, an electronic parking brake (EPB) signal input unit 116, an EPB driving unit 118, an additional braking valve driving unit 106, a first motor driving unit 120, a first watchdog signal generation unit 104, and a first micro control unit (MCU) 102.

The first pedal signal input unit 122 may receive a pedal stroke value by a first channel output of the pedal sensor, and may transfer the pedal stroke value to the first MCU 102.

Accordingly, the first MCU 102 may perform braking control by determining the braking state of a driver based on the pedal stroke value.

The cylinder pressure input unit 110 may receive a master cylinder pressure value and a backup cylinder pressure value from the cylinder pressure sensor, and may transfer the pressure values to the first MCU 102.

The first wheel speed input unit 114 may receive a wheel speed value from the wheel speed sensor, decode the wheel speed value through an ASIC chip and transfer the decoded wheel speed value to the first MCU 102, so as to receive not only a vehicle speed but also respective wheel speeds.

The EPB signal input unit 116 may receive the EPB signal for operating a parking brake, and may transfer the EPB signal to the first MCU 102.

The EPB driving unit 118 may operate the parking brake.

The additional braking valve driving unit 106 may drive the additional braking valve including an inlet valve and an outlet valve configured to control a hydraulic pressure being supplied to a wheel cylinder for additional braking in accordance with an anti-lock brake system (ABS) or an electronic stability control (ESC) function.

The first motor driving unit 120 may drive the braking motor for main braking of the vehicle.

Further, the braking motor may be independently driven by the first motor driving unit 120 and a second motor driving unit 206 through adoption of a double winding motor.

The first watchdog signal generation unit 104 generates a watchdog signal in case of a failure by counting whether the first MCU 102 is normal, while communicating with the first MCU 102.

The first MCU 102 may control the additional braking valve driving unit 106, the first motor driving unit 120, and the EPB driving unit 118 based on the pedal stroke value, the pressure value, the wheel speed value, and the EPB signal being input from one or more of the first pedal signal input unit 124, the cylinder pressure input unit 110, the first wheel speed input unit 114, and the EPB signal input unit 116 in accordance with the sub-control monitoring signal generated by the sub-controller 200.

A first communication unit 108 may communicate with a peripheral control device in the vehicle through P-CAN or C-CAN. Accordingly, the first MCU 102 may perform the braking control by the cooperative control in association with the peripheral control device in the vehicle.

A first brake light switch 112 may operate a brake light in accordance with the pedal stroke value through the first MCU 102.

Further, the sub-controller 200 may be configured to include a second pedal signal input unit 212, a second wheel speed input unit 214, a main braking valve driving unit 208, the second motor driving unit 206, an additional braking valve power switch 210, a second watchdog signal generation unit 202, and a second MCU 204.

The second pedal signal input unit 212 may receive a pedal stroke value by a second channel output of the pedal sensor, and may transfer the pedal stroke value to the second MCU 204. Accordingly, the second MCU 204 may perform braking control by determining the braking state of a driver based on the pedal stroke value.

The second wheel speed input unit 214 may receive a wheel speed value from the wheel speed sensor, decode the wheel speed value through an ASIC chip and transfer the decoded wheel speed value to the second MCU 204, so as to receive not only a vehicle speed but also respective wheel speeds.

The main braking valve driving unit 208 may drive the main braking valve configured to adjust a hydraulic pressure of a master cylinder for the main braking of the vehicle in accordance with the operation of the pedal.

The second motor driving unit 206 may drive the braking motor for the main braking of the vehicle.

The additional braking valve power switch 210 may prevent a malfunction of the additional braking valve in case of a failure of the main controller 100 by switching the power of the additional braking valve including an inlet valve and an outlet valve configured to control a hydraulic pressure being supplied to a wheel cylinder for the additional braking in accordance with an anti-lock brake system (ABS) or an electronic stability control (ESC) function.

The second watchdog signal generation unit 202 generates a watchdog signal in case of the failure by counting whether the second MCU 204 is normal, while communicating with the second MCU 204.

The second MCU 204 may control the main braking valve driving unit 120 for main braking of a vehicle and the motor driving unit 122 based on the pedal stroke value and the wheel speed value being input from one or more of the second pedal signal input unit 210 and the wheel speed input unit 208 in accordance with the main control monitoring signal generated by the main controller 100, and may turn off the additional braking valve power switch 210 to prevent the operation of the additional braking valve.

A second communication unit 216 may communicate with a peripheral control device in the vehicle through P-CAN or C-CAN. Accordingly, the second MCU 204 may perform the braking control by the cooperative control in association with the peripheral control device in the vehicle.

A second brake light switch 218 may operate the brake light in accordance with the pedal stroke value through the second MCU 204.

Further, since the first MCU 102 performs EPB and the additional braking control, and the second MCU 204 performs only the main braking control, the second MCU 204 may have a lower performance specification than the first MCU 102 of the main controller 100 to achieve economic savings.

As described above, the first MCU and the second MCU cooperate with each other while exchanging information in real time, and in a normal state, they perform, like a single MCU, the braking control by controlling the main braking valve driving unit 208, the first motor driving unit 120, the second motor driving unit 206, the EPB driving unit 118, and the additional braking valve driving unit 106.

However, if the first MCU 102 is in a failure state, the first MCU 102 and the second MCU 204 may hand over a control right for implementing the main braking to each other, and the second MCU 204 may perform the braking control by controlling the main braking valve driving unit 208, the second motor driving unit 206, and the additional braking valve power switch 210, whereas if the second MCU 204 is in a failure state, the first MCU 102 may perform the braking control by controlling the first motor driving unit 120 and the EPB driving unit 118.

As described above, according to the integrated electronic brake apparatus according to an embodiment of the disclosure, a control module of the integrated electronic brake apparatus may be configured as a main controller and a sub-controller provided in two independent areas in one enclosure using an internal connection bus, and the main controller and the sub-controller may hand over a control right for implementing main braking to each other through mutual cooperation with real-time information exchange in a manner that in case of a main controller failure, the sub-controller not only cuts off a power of an additional braking valve for additional braking to prevent malfunction but also controls a main braking valve and a braking motor to implement main braking, and in case of a sub-controller failure, the main controller controls the braking motor and an EPB to implement the main braking. Therefore, in implementing a small autonomous vehicle, it is possible to reduce the size and weight of the electronic braking apparatus and improve stability thereof.

Figure 3:
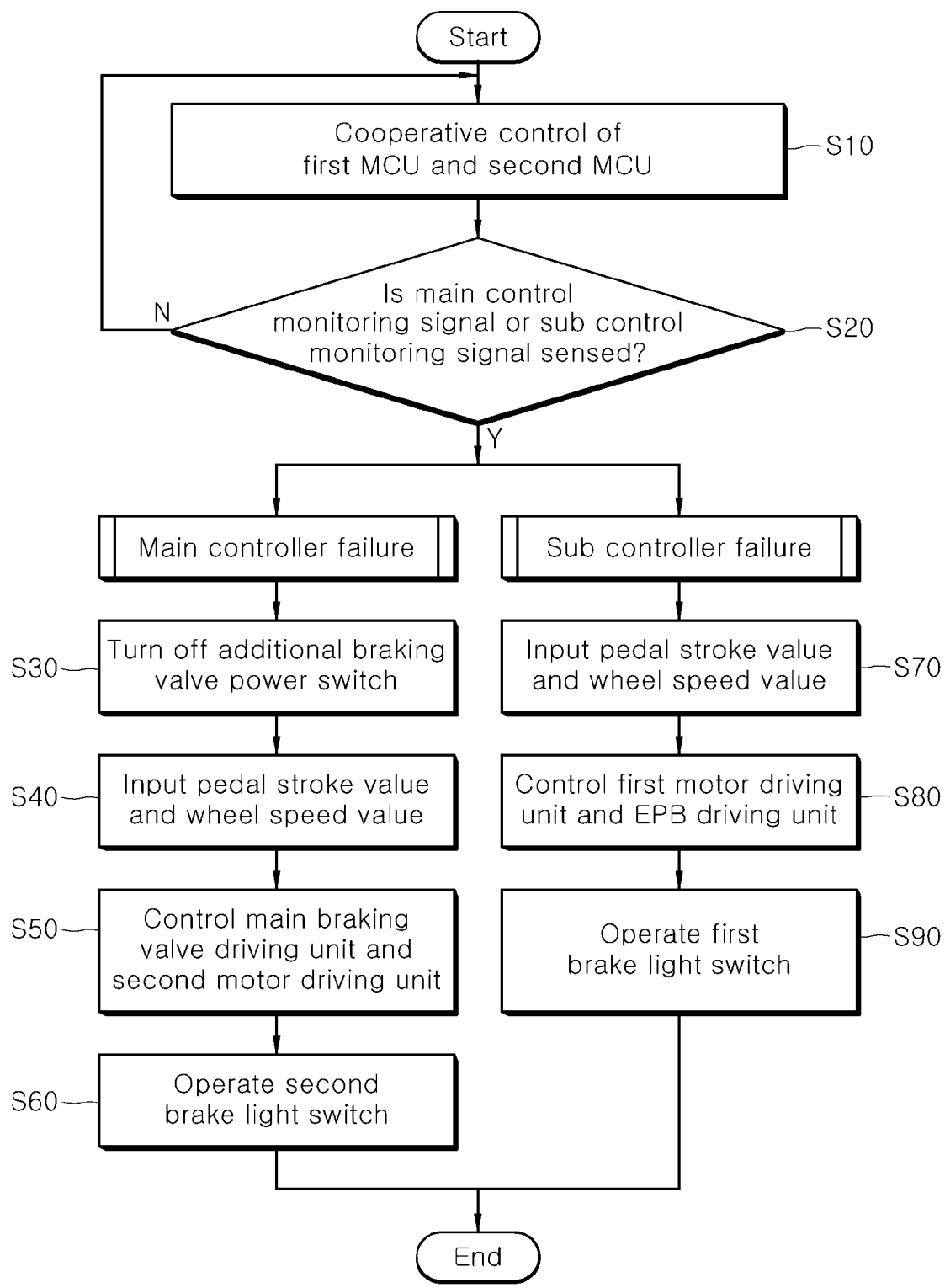
FIG. 3 is a flowchart explaining a method for controlling an integrated electronic brake apparatus according to an embodiment of the disclosure.

FIG. 3 is a flowchart explaining a method for controlling an integrated electronic brake apparatus according to an embodiment of the disclosure.

As illustrated in FIG. 3, in the method for controlling an integrated electronic brake apparatus according to an embodiment of the disclosure, the first MCU 102 of the main controller 100 and the second MCU 204 of the sub-controller 200 receive one or more of values of the pedal sensor, the cylinder pressure sensor, and the wheel speed sensor, and the EPB signal through mutual cooperative control while sharing information in real time, and perform the braking control by controlling the main braking valve driving unit 208, the first motor driving unit 120, the second motor driving unit 206, the EPB driving unit 118, and the additional braking valve driving unit 106 in accordance with the operation of the pedal, and the first watchdog signal generation unit 104 and the second watchdog signal generation unit 202 count whether the first MCU 102 and the second MCU 204 are normal, while communicating with the first MCU 102 and the second MCU 204, and each generate a watchdog signal in case of a failure, and the main controller and the sub-controller generate fail signals in accordance with the result of diagnosis through hardware diagnosis (S10).

While the first MCU 102 and the second MCU 204 perform the braking control through the cooperative control in step S10, the first MCU 102 senses whether the sub-control monitoring signal is generated by the sub-controller 200, and the second MCU 204 senses whether the main control monitoring signal is generated by the main controller 100 (S20).

Here, the main control monitoring signal may include one or more of the watchdog signal generated by the main controller and a fail signal of hardware in accordance with the result of diagnosis of the main controller, and the sub-control monitoring signal may include one or more of the watchdog signal generated by the sub-controller and a fail signal of hardware in accordance with the result of diagnosis of the sub-controller.

In step S20, if the main control monitoring signal is sensed after the main control monitoring signal or the sub-control monitoring signal is sensed, the second MCU 204 determines that the main controller 100 is in a failure state, and thus turns off the additional braking valve power switch 210 (S30).

Accordingly, during the failure of the main controller 100, the malfunction of the additional braking valve can be prevented by cutting off the power of the additional braking valve including the inlet valve and the outlet valve configured to control the hydraulic pressure being supplied to the wheel cylinder for the additional braking in accordance with the anti-lock brake system (ABS) or electronic stability control (ESC) function.

Further, the second MCU 204 receives the pedal stroke value and the wheel speed value from the second pedal signal input unit 212 and the second wheel speed input unit 214 (S40).

Here, the second MCU 204 may determine the effectiveness of the pedal signal input from the second pedal signal input unit 212 and the pedal signal input from the first pedal signal input unit 122 of the main controller 100.

After receiving the pedal stroke value and the wheel speed value in step S40, the second MCU 204 implements the main braking of the vehicle by controlling the main braking valve driving unit 208 and the second motor driving unit 206 in accordance with the pedal stroke value and the wheel speed value (S50).

Here, the second MCU 204 may also perform the braking control by the cooperative control in association with the peripheral control device in the vehicle through the second communication unit 216.

While controlling the main braking of the vehicle in step S50, the second MCU 204 turns on the brake light by operating the second brake light switch 218 (S60).

In contrast, if the sub-control monitoring signal is sensed after the main control monitoring signal and the sub-control monitoring signal are sensed in step S20, the first MCU 102 determines that the sub-controller 100 is in the failure state, and receives the pedal stroke value and the wheel speed value from the first pedal signal input unit 122 and the first wheel speed input unit 114 (S70).

Here, the first MCU 102 may determine the effectiveness of the pedal signal input from the first pedal signal input unit 122 and the pedal signal input from the second pedal signal input unit 212 of the sub-controller 200.

After receiving the pedal stroke value and the wheel speed value in step S70, the first MCU 102 brakes the vehicle by controlling the first motor driving unit 120 and the EPB driving unit 118 in accordance with the pedal stroke value and the wheel speed value (S80).

Here, the first MCU 102 may perform the braking control by the cooperative control in association with the peripheral control device in the vehicle through the first communication unit 108.

While braking the vehicle in step S80, the first MCU 102 turns on the brake light by operating the first brake light switch 112 (S90).

As described above, according to the method for controlling an integrated electronic brake apparatus according to an embodiment of the disclosure, a control module of the integrated electronic brake apparatus may be configured as a main controller and a sub-controller provided in two independent areas in one enclosure using an internal connection bus, and the main controller and the sub-controller may hand over a control right for implementing main braking to each other through mutual cooperation with real-time information exchange in a manner that in case of a main controller failure, the sub-controller not only cuts off a power of an additional braking valve for additional braking to prevent malfunction but also controls a main braking valve and a braking motor to implement main braking, and in case of a sub-controller failure, the main controller controls the braking motor and an EPB to implement the main braking. Therefore, in implementing a small autonomous vehicle, it is possible to reduce the size and weight of the electronic braking apparatus and improve stability thereof.

The implementation described above in the present specification may be performed by, for example, a method or a process, an apparatus, a software program, a data stream or a signal. Although being discussed only in the context of single-form implementation (e.g., being discussed only as a method), the discussed features may be implemented even as another form (e.g., apparatus or program). The apparatus may be implemented by proper hardware, software, and firmware. The method may be implemented by, for example, an apparatus, such as a processor generally referring to a processing device including a computer, a microprocessor, an integrated circuit, or a programmable logic device. The processor also includes a communication device, such as a computer, a cellular phone, a portable/personal digital assistant (PDA), and other devices, which facilitate information communication between end users.

Although exemplary embodiments of the disclosure have been described for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. An integrated electronic brake apparatus configured for braking a vehicle, the integrated electronic brake apparatus comprising a main controller positioned at a first area within an enclosure, a sub-controller positioned at a second area within the enclosure, and a connection bus extending between the first and second areas and configured to transmit a signal between the main controller and the sub-controller,
    wherein the main controller is configured to:
        receive (1) one or more values of a pedal sensor, a cylinder pressure sensor, and a wheel speed sensor and (2) an electronic parking brake (EPB) signal in accordance with a sub-control monitoring signal generated by the sub-controller;
        drive a braking motor in accordance with an operation of a pedal to provide main braking for the vehicle;
        drive an additional braking valve for additional braking; and
        generate a main control monitoring signal, and
    wherein the sub-controller is configured to:
        receive one or more of the values of the pedal sensor and the wheel speed sensor in accordance with the main control monitoring signal generated by the main controller;
        drive a main braking valve for braking the vehicle and the braking motor in accordance with the operation of the pedal; and
        control a power of the additional braking valve, and generate the sub-control monitoring signal,
    wherein:
        the main controller includes a first watchdog signal generation unit configured to generate the main control monitoring signal with an indication of a failure of the main controller, and
        the sub-controller is configured to take over control of the main braking of the vehicle from the main controller based on the indication of failure of the main controller from the first watchdog signal generation unit.

2. The integrated electronic brake apparatus of claim 1, wherein:
    the sub-controller includes a second watchdog signal generation unit configured to generate the sub-control monitoring signal with an indication of a failure of the sub-controller, and
    the main controller is configured to implement the main braking of the vehicle and an EPB operation based on the indication of failure of the sub-controller from the second watchdog signal generation unit.

3. The integrated electronic brake apparatus of claim 1, further comprising:
    a first connector positioned at the first area and configured to connect the main controller to a peripheral device; and
    a second connector positioned at the second area and configured to connect the sub-controller to the peripheral device.

4. The integrated electronic brake apparatus of claim 1, wherein the main controller and the sub-controller are configured to determine effectiveness of a pedal signal input by the main controller and a pedal signal input by the sub-controller.

5. The integrated electronic brake apparatus of claim 1, wherein the main controller comprises:
    a first pedal signal input unit configured to receive a pedal stroke value from the pedal sensor;
    a cylinder pressure input unit configured to receive a cylinder pressure value from the cylinder pressure sensor;
    a first wheel speed input unit configured to receive and decode a wheel speed value from the wheel speed sensor;
    an EPB signal input unit configured to receive an EPB signal;
    an EPB driving unit configured to operate a parking brake;
    an additional braking valve driving unit configured to drive the additional braking valve for the additional braking;
    a first motor driving unit configured to drive the braking motor;
    a first watchdog signal generation unit configured to generate a watchdog signal; and
    a first micro control unit (MCU) configured to control the additional braking valve driving unit, the first motor driving unit, and the EPB driving unit based on a signal input from at least one of the first pedal signal input unit, the cylinder pressure input unit, the first wheel speed input unit, and the EPB signal input unit in accordance with the sub-control monitoring signal.

6. The integrated electronic brake apparatus of claim 5, wherein the additional braking valve comprises an inlet valve and an outlet valve configured to control a hydraulic pressure being supplied to a wheel cylinder for an anti-lock brake system (ABS) and electronic stability control (ESC) driving.

7. The integrated electronic brake apparatus of claim 5, wherein the first pedal signal input unit is configured to receive the pedal stroke value via a first channel output of the pedal sensor.

8. The integrated electronic brake apparatus of claim 5, wherein the sub-controller comprises:
    a second pedal signal input unit configured to receive a pedal stroke value from the pedal sensor;
    a second wheel speed input unit configured to receive and decode a wheel speed value from the wheel speed sensor;
    a main braking valve driving unit configured to drive the main braking valve for braking of a vehicle;
    a second motor driving unit configured to drive the braking motor;
    an additional braking valve power switch configured to switch a power of the additional braking valve;
    a second watchdog signal generation unit configured to generate a watchdog signal; and a second MCU configured to control the additional braking valve power switch, the main braking valve driving unit, and the second motor driving unit based on a signal input from at least one of the second pedal signal input unit and the second wheel speed input unit in accordance with the main control monitoring signal.

9. The integrated electronic brake apparatus of claim 8, wherein the second pedal signal input unit is configured to receive the pedal stroke value via a second channel output of the pedal sensor.

10. The integrated electronic brake apparatus of claim 8, wherein the second MCU has a lower performance specification than that of the first MCU of the main controller.

11. The integrated electronic brake apparatus of claim 1, wherein the sub-controller is configured to cut off power of the additional braking valve based on the indication of failure of the main controller from the first watchdog signal generation unit.

12. The integrated electronic brake apparatus of claim 1, wherein the second MCU is configured to cut off power of the additional braking valve based on the indication of failure of the first MCU from the first watchdog signal generation unit.

13. A method for controlling an integrated electronic brake apparatus for braking a vehicle, comprising:
controlling, by a first micro control unit (MCU) and a second MCU in cooperation with each other, a main braking valve driving unit, a first motor driving unit, a second motor driving unit, an electronic parking brake (EPB) driving unit, and an additional braking valve driving unit;
sensing, by the first and second MCUs, a main control monitoring signal generated by a main controller and a sub-control monitoring signal generated by a sub-controller;
turning off, by the second MCU, an additional braking valve power switch when the second MCU senses the main control monitoring signal;
receiving, by the second MCU, a pedal stroke value and a wheel speed value from a second pedal signal input unit and a second wheel speed input unit;
controlling, by the second MCU, the main braking valve driving unit and the second motor driving unit in accordance with the pedal stroke value and the wheel speed value;

receiving, by the first MCU, a pedal stroke value and a wheel speed value from a first pedal signal input unit and a first wheel speed input unit when the first MCU senses the sub-control monitoring signal; and
controlling, by the first MCU, the first motor driving unit and the EPB driving unit in accordance with the pedal stroke value and the wheel speed value,
wherein:
the first MCU is coupled to a first watchdog signal generation unit configured to generate the main control monitoring signal with an indication of a failure of the first MCU, and
the second MCU is configured to take over control of main braking of the vehicle from the first MCU based on the indication of failure of the first MCU from the first watchdog signal generation unit.

14. The method of claim 13, wherein:
the second MCU is coupled to second watchdog signal generation unit configured to generate the sub-control monitoring signal with an indication of a failure of the second MCU, and
the first MCU is configured to implement the main braking of the vehicle and an EPB operation based on the indication of failure of the second MCU from the second watchdog signal generation unit.

15. The method of claim 13, further comprising determining, by the first MCU and the second MCU, effectiveness of a pedal signal input from the first pedal signal input unit and a pedal signal input from the second pedal signal input unit.

16. The method of claim 13, further comprising operating, by the first MCU and the second MCU, a first brake light switch and a second brake light switch, respectively when the pedal stroke value is input.

17. The method of claim 13, wherein controlling the main braking valve driving unit and the second motor driving unit comprises performing, by the second MCU, braking control by a cooperative control in association with a peripheral control device through a communication unit.

18. The method of claim 13, wherein controlling the first motor driving unit and the EPB driving unit comprises performing, by the first MCU, braking control by a cooperative control in association with a peripheral control device through a communication unit.

* * * * *